United States Patent [19]
Marshall et al.

[11] Patent Number: 5,818,715
[45] Date of Patent: Oct. 6, 1998

[54] METHOD AND SYSTEM FOR EFFICIENTLY MODIFYING A PROJECT MODEL IN RESPONSE TO AN UPDATE TO THE PROJECT MODEL

[75] Inventors: Burdell Bobby Marshall; Tzvi Raz, both of Grapevine, Tex.

[73] Assignee: International Business Machines Corporation, Armonk, N.Y.

[21] Appl. No.: 229,000

[22] Filed: Apr. 18, 1994

[51] Int. Cl.$^6$ .................................................. G06F 17/60
[52] U.S. Cl. ........................................................ 364/402
[58] Field of Search .................................. 364/401, 402, 364/468

[56] References Cited

U.S. PATENT DOCUMENTS

| | | | |
|---|---|---|---|
| 5,016,170 | 5/1991 | Pollalis et al. | 364/402 |
| 5,161,103 | 11/1992 | Kosaka et al. | 364/401 R |
| 5,197,001 | 3/1993 | Mukherjee | 364/401 R |
| 5,260,868 | 11/1993 | Gupta et al. | 364/402 |
| 5,276,607 | 1/1994 | Harris et al. | 364/401 R |
| 5,291,397 | 3/1994 | Powell | 364/402 |
| 5,303,144 | 4/1994 | Kawashima et al. | 364/401 R |
| 5,303,146 | 4/1994 | Ammirato et al. | 364/402 |
| 5,369,570 | 11/1994 | Parad | 364/401 R |

*Primary Examiner*—Robert A. Weinhardt
*Attorney, Agent, or Firm*—Edward Duffield; Barry J. Bumgardner; Andrew J. Dillon

[57] ABSTRACT

A method and system for modifying a project model in response to an update. The project model including a plurality of activities, wherein each activities includes an early start date and a late finish date. A number of activities are initially added from the project model to a list in response to an update. Each activity added to the list is directly affected by the update. For early dates, an activity with an early start date that precedes all other early start dates with respect to other activities within the list is removed. Then, the early start date for the removed activity is redetermined in response to the update. Activities which succeed the removed activity and which are related to the activity to the list are added to the list if absence of a match between the redetermined early start date and the early start date associated with the removed activity exists. Thereafter, another activity is removed and the early dates are redetermined and new activities are added if the redetermined early start date does not match the original start date associated with the removed activity. This processes continues until all of the activities have been removed from the list. Late finish dates are redetermined in a similar manner except that the activity removed from the list, has a late finish date that precedes all other late finish dates with respect to other activities within the list.

21 Claims, 8 Drawing Sheets

$$EarlyStart(A) = \begin{bmatrix} ActualStart(A) & \text{if given, otherwise} \\ ActualFinish(A) - ActualDuration(A) & \text{if both given, otherwise} \\ ActualFinish(A) - Duration(A) & \text{if } ActualFinish(A) \text{ given, otherwise} \\ MandatoryStart(A) & \text{if given, otherwise} \\ MandatoryFinish(A) - Duration(A) & \text{if } MandatoryFinish(A) \text{ given, otherwise} \\ \text{MAX} \begin{bmatrix} TimeNow \\ RequiredEarliestStart(A) & \text{if given} \\ \displaystyle\text{MAX}_{p\,|\,TypeRel(p,A)\,=\,FS,SS} EarlyStart(p) + LagRel(p,A) \\ \displaystyle\text{MAX}_{p\,|\,TypeRel(p,A)\,=\,FF,SF} EarlyStart(p) + LagRel(p,A) - Duration(A) \end{bmatrix} \end{bmatrix}$$

$$EarlyFinish(A) = EarlyStart(A) + DurationRemaining(A)$$

$$DurationRemaining(A) = \begin{bmatrix} Duration(A) \times \left(1 - \dfrac{\%Complete(A)}{100}\right) & \text{if } \%Complete(A) \text{ given, otherwise} \\ DurationLeft(A) & \text{if given, otherwise} \\ Duration(A) \end{bmatrix}$$

| | |
|---|---|
| A | represents a specific activity A |
| p | represents any activity that is a predecessor of A |
| TypeRel(p,A) | means the type of the relationship between activity p and activity A. The type can be Start-to-Start (SS), Start-to-Finish (SF), Finish-to-Start (FS) or Finish-to-Finish (FF). |
| LagRel(p,A) | means the numerical value of the lag of the relationship between activity p and activity A. |
| MAX $_{p\,|\,TypeRel(p,A)\,=\,FS,SS}$ | means "the maximum of all values of the expression to the right calculated when p is a predecessor to activity A such that the type of its relationship with A is either Finish-to-Start or Start-to-Start". The other maximum operation has a similar interpretation. |

*Fig. 1*

*Prior Art*

$$LateFinish(A) = \text{MIN} \begin{bmatrix} ActualFinish(A) & \text{if given, otherwise} \\ ActualStart(A) + ActualDuration(A) & \text{if both given, otherwise} \\ ActualStart(A) + Duration(A) & \text{if } ActualStart(A) \text{ given, otherwise} \\ MandatoryFinish(A) & \text{if given, otherwise} \\ MandatoryStart(A) + Duration(A) & \text{if } MandatoryStart(A) \text{ given, otherwise} \\ \text{MIN} \begin{bmatrix} RequiredLatestFinish(A) & \text{if given} \\ EarlyFinish(A) & \text{if A has no successors} \\ \underset{s \mid TypeRel(A,s) = FF,FS}{\text{MIN}} LateFinish(s) - LagRel(A,s) & \\ \underset{s \mid TypeRel(A,s) = SS,SF}{\text{MIN}} LateFinish(s) - LagRel(A,s) + Duration(A) & \end{bmatrix} \end{bmatrix}$$

$$LateStart(A) = LateFinish(A) - DurationRemaining(A)$$

$$DurationRemaining(A) = \begin{cases} Duration(A) \times \left(1 - \dfrac{\%Complete(A)}{100}\right) & \text{if } \%Complete(A) \text{ given, otherwise} \\ DurationLeft(A) & \text{if given, otherwise} \\ Duration(A) & \end{cases}$$

| | |
|---|---|
| A | represents a specific activity A |
| s | represents any activity that is a succesor of A |
| TypeRel(A,s) | means the type of the relationship between activity A and activity s. The type can be Finish-to-Finish (SS), Finish-to-Finish (SF), Finish-to-Finish (FS) or Finish-to-Finish (FF). |
| LagRel(A,s) | means the numerical value of the lag of the relationship between activity A and activity s. |
| MAX $s \mid TypeRel(A,s) = FF,FS$ | means "the maximum of all values of the expression to the right calculated when s is a successor of activity A such that the type of the relationship from A to s is either Finish-to-Finish or Finish-to-Start". The other maximum operations have similar interpretations. |

Fig. 2

Prior Art

METHOD AND SYSTEM FOR EFFICIENTLY MODIFYING A PROJECT MODEL IN RESPONSE TO AN UPDATE TO THE PROJECT MODEL

BACKGROUND OF THE INVENTION

1. Technical Field

The present invention relates to an improved data processing system, and in particular to an improved method and system for project planning and control utilizing a data processing system.

2. Description of the Related Art

With increasingly competitive business environments, a growing share of development, production, and delivery efforts are being executed in the form of projects. Work organized in a project form involves creating or recruiting teams of people for a specific effort or project. A project typically requires a large amount of time and involves many individuals from different disciplines and professions. Additionally, project oriented tasks typically have more uncertainty and fluidity than other types of work, such as repetitive tasks performed with functionally oriented work.

Project management involves both project planning and control of the project. In project planning, a schedule is developed for the execution of various activities that constitute the project. In project control, the actual execution to the planned execution is identified, discrepancies that require action are identified, and appropriate actions are selected and implemented in response to an analysis of the progress.

As a result, specialized methodology and tools for managing projects have been needed. For example, one known technique consists of building a model of the project in terms of its activities, dependencies, resources, etc., and utilizing the model to generate the work assignments in a project oriented organization. With the wide spread use of data processing systems, project planning and control is one of the tasks that may be efficiently accomplished with the aid of applications designed to model projects. These project models are also referred to as "project schedules" in this disclosure.

Referring now to FIG. 3, a logic diagram 100, also referred to as a "PERT" chart, is depicted. As can be seen, a number of activities A1–A19 are illustrated. Logic diagram 100 illustrates the progression of activities that must take place in order to complete a project. Various paths can be found in logic diagram 100. A path includes a series of activities that are connected to each other. For example, activities A1–A8 form one path and activities A1–A4 and A18–A19 form another path. In this example, "predecessor activities" of activity A5 include activities A1–A4 and these activities are related to activity A5. "Successor activities" of activity A5 include activities A6–A8 and these activities also are related to activity A5. Activities A1–A4 and A6–A8 are all related to activity A5. In this path, activity A5 cannot be performed until the predecessor activities have been completed and activities succeeding A5, such as activities A6–A8, cannot be initiated until activity A5 has been completed. Each activity is associated with a number of different dates including "early dates" and "late dates" which will be explained in greater detail herein. Basically, an activity is related to another activity if a path can be traced between the two activities.

More specifically, a relationship between two activities is defined as a time dependency between the two activities resulting from the entry/exit criteria of one activity being prerequisites or corequisites to those of the other activity. A relationship is defined by two attributes: (1) type and (2) lag. The relationship "type" is an ordered pair of start/finish points, including one point from each of two related activities, such that the first point must be reached before the second point can be reached. Four types of relationships are possible:

1. Start-to-start: the start of one activity is dependent on the start of another.

2. Start-to-finish: the finish of one activity is dependent on the start of another activity.

3. Finish-to-start: the start of one activity is dependent on the finish of another activity.

4. Finish-to-finish: the finish of one activity is dependent on the finish of another activity.

The "lag" is the amount of time that must elapse before the successor activity can begin or end. In other words, it is the length of the relationship. Three types of lag may exist:

1. Zero lag indicates that a successor activity begins or ends with no delay due to lag from the start or finish of its predecessor activity.

2. Positive lag indicates that a successor activity begins or ends delayed by at least the lag amount from the start or finish of its predecessor activity.

3. Negative lag indicates that a successor activity begins or ends before its predecessor activity by at least the amount of the lag.

Required dates are determined based on considerations external to time dependencies in resource requirements. Since the duration of an activity is given, either the start or the finish date, but not both, may be defined as required dates for the activity. Required dates might be either mandatory or upper or lower bounds (i.e., earliest possible start or latest possible finish). Actual dates reflect the actual occurrence of the start and finish events for an activity. Typically actual dates are entered while reporting the progress of the project.

"Early dates" are the earliest points in time that activities can be scheduled in a project without violating time dependencies specified in the relationships between various activities. The early start of any activity, "A", is the latest of the following dates:

1. Early start plus lag for the activities relating to A as Start-to-Start;

2. Early finish plus lag for the activities relating to A as Finish-to-Start;

3. Early finish plus lag less duration of activity A for activities relating to A as Finish-to-Finish;

4. Early start plus lag less duration of A for activities relating to A as start-to-finish; or the current date on the project, which is also referred to as "time now".

The early finish of an activity is equal to the sum of its early start and the duration of the activity. If actual or mandatory dates are specified within the project schedule, then those dates become the early dates. If required dates of the earliest possible start or the latest possible finish types are specified, then they override the calculated dates. Early start dates (Early Start (A)), early finish dates (Early Finish (A)), and duration remaining (Duration Remaining (A)) for an activity (A) may be determined utilizing the formulas depicted in FIG. 1.

Late dates are the latest points in time that an activity can be scheduled without violating time relationships and without delaying the completion of successor activities for the particular activity being scheduled. The late finish of a specific activity, "A" is the earliest of the following dates:

1. Late start less lag for all activities that A relates to as Finish-to-Start;
2. Late start less lag plus duration of A for all activities that A relates to as Start-to-Start;
3. Late finish less lag for all activities that A relates to as Finish-to-Finish;
4. Late finish less lag plus duration of A for all activities that A relates to as Start-to-Finish; or
5. Required finish date of A, if defined.

The late start date of an activity is equal to the late finish less its duration. If actual or mandatory dates are specified in the project schedule, then they become the late dates. If an early as possible start date or latest possible finish date was specified, then this date overrides the calculated late dates. A Start-to-Start relationship is a relationship in which the start of one activity is dependent on the start of another activity. A Start-to-Finish relationship is a relationship in which the finish of one activity is dependent on the start of another. Finish-to-Start is a relationship in which the start of one activity is dependent on the finish of another. Finish-to-Finish is a relationship in which the finish of one activity is dependent on the finish of another. Late finish (Late Finish (A)), late start (Late Start (A)), and duration remaining (Duration Remaining (A)) may be determined from the formulas depicted in FIG. 2.

Scheduling activities consists of associating dates to the start and finish points of the activities. This scheduling is accomplished based on the analysis of either the relationships among the activities or on their resource requirements. An analysis may be performed for a specific point in time called the current date or "time now". Required dates are determined based on considerations that are external to time dependencies and on resource requirements. Required dates may either be mandatory or have upper or lower bounds (earliest possible start, latest possible finish). Actual dates reflect the fact or occurrence of start and finish events. Typically, actual dates are entered while reporting the progress of a project.

Typically, Gantt charts, such as the one depicted in FIG. 4, are employed to provide a schedule report in graphic format. Gantt charts are also referred to as "bar charts" or "bar schedules". As can be seen with reference to Gantt chart 102 in FIG. 2, rows of corresponding activities and columns of corresponding time intervals are depicted along with bars to indicate various dates or time periods, such as actual start dates, early dates, and late dates. For example, bar B1 indicates an actual start and finish date while bar B2 indicates a period of time for an early date to hire local staff while bar B3 depicts a late date for hiring local staff.

The "total float" is the difference between the late start date and the early start date of an activity. The total float represents the amount of time that an activity may be delayed without affecting the completion of the entire project. In the instance in which the total float equals zero, no flexibility exists in scheduling the activity. Activities in which the total float equals zero are called critical activities and the set of all critical activities is called the critical path. Critical activities require constant management attention to avoid delays, since any delay in the critical path will cause the completion date of the entire project to slip.

As a result, it is important to track early dates and late dates to determine the various floats that may exist to see if a critical path is present. Typically a user will plan a project utilizing a logic diagram to enter all the data needed to determine a plan of action and produce a Gantt chart to analyze and track the project.

Frequently, as various activities are started and completed, early dates and late dates may be affected by differences in the actual start and completion dates of these activities, as compared to the scheduled start and completion dates. Changes in early and late dates may create, delete, or change a critical path. Therefore, keeping track of changes to activities during a project is essential to efficiently controlling the progress of the project. As a result, changes to early dates and late dates are typically determined by reanalyzing the entire project model or project schedule in the data processing system. As the number of activities and requirements increase, the amount of time required to reevaluate a project model increases. Therefore, it would be advantageous to have a method and system for reducing the amount of time needed to reevaluate early and late dates in a data processing system in response to changes in activities that potentially effect the early or late dates.

SUMMARY OF THE INVENTION

It is therefore one object of the present invention to provide an improved data processing system.

It is another object of the present invention to provide an improved method and system for project planning and control utilizing a data processing system.

It is yet another object of the present invention to provide an improved method and system for project planning and control utilizing a data processing system, wherein the amount of time needed to reevaluate a project model is reduced.

The foregoing objects are achieved as is now described. The present invention provides a method and system for efficiently modifying a project model in response to an update. The project model typically includes a plurality of activities, wherein each activity includes an early start date wherein the activity cannot be commenced prior to the early start date. A number of activities are initially added from the project model to a list in response to an update. Each activity added to the list is directly affected by the update.

For early dates, an activity with an early start date that precedes all other early start dates with respect to other activities within the list is removed. Then, the early start date for the removed activity is redetermined in response to the update. Activities which succeed the removed activity and which are related to the activity to the list are added to the list if an absence of a match exits between the redetermined early start date and the early start date associated with the removed activity. Thereafter, another activity is removed, the early start date is redetermined and new activities are added if the redetermined early start date does not match the original start date associated with the removed activity. This processes continues until all of the activities have been removed from the list, wherein the project model is efficiently modified.

Similarly, the project model may be modified with respect to late finish dates in response to an update to the project model. A late finish date is a date wherein an activity cannot be completed after this particular date. In modifying a project for late finish dates, a number of activities from the project model are added to a list in response to an update, wherein each activity added is directly affected by the update. An activity is removed from the list, wherein the removed activity has a late finish date that precedes all other late finish dates with respect to other activities within the list. Thereafter, the late finish date for the removed activity is redetermined in response to the update, and activities that precede the removed activity and are related to that activity are added to the list in response to an absence of a match between the redetermined late finish date and the late finish date associated with the removed activity. These steps of removing, redetermining, and adding are repeated until the list is empty.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 depicts known formulas for determining early dates and duration remaining time with respect to early dates;

FIG. 2 is an illustration of known formulas utilized in determining late dates and duration remaining times with respect to late dates;

DETAILED DESCRIPTION OF PREFERRED EMBODIMENT

Figure 3:
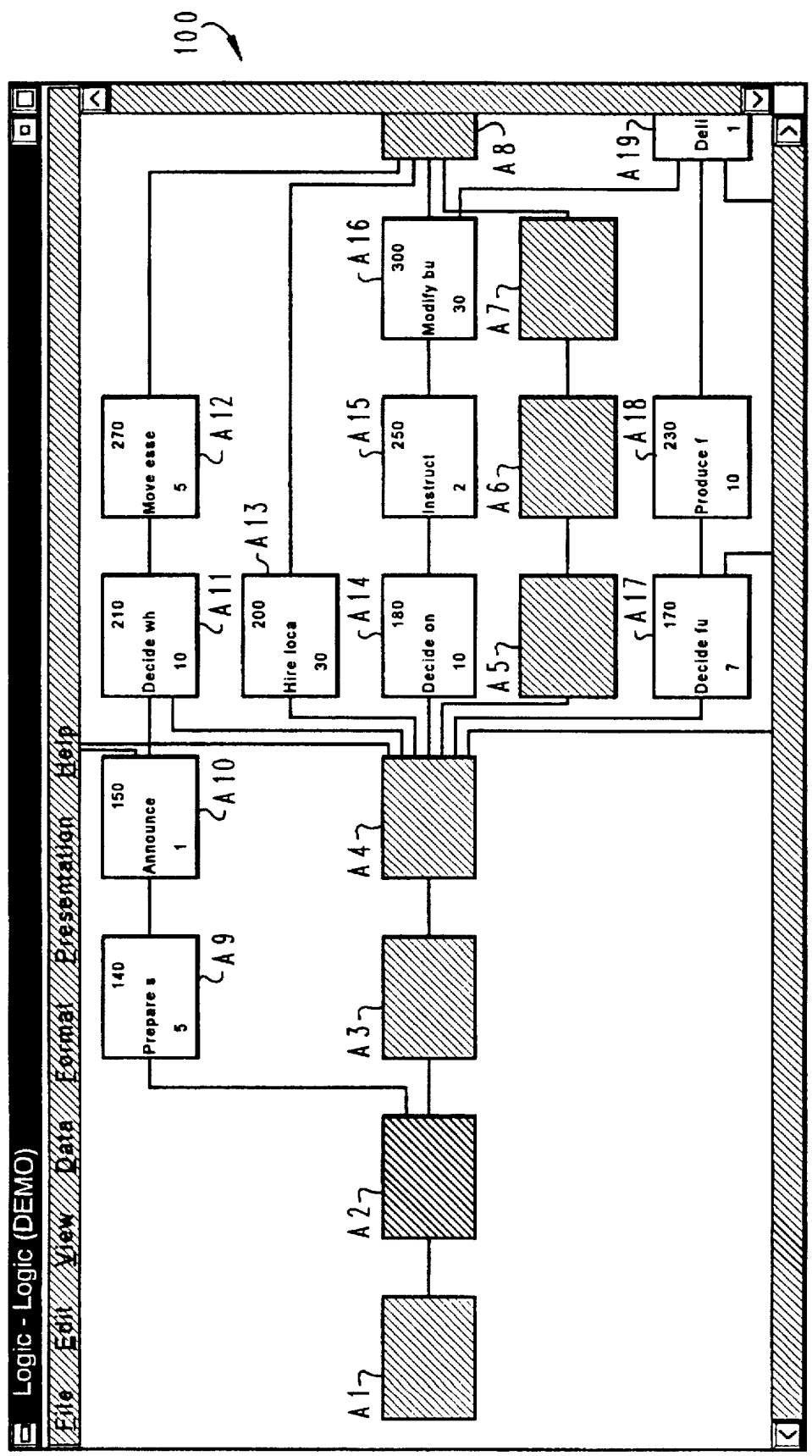
FIG. 3 depicts a logic diagram, also referred to as a "PERT" diagram known in the prior art.
Figure 4:
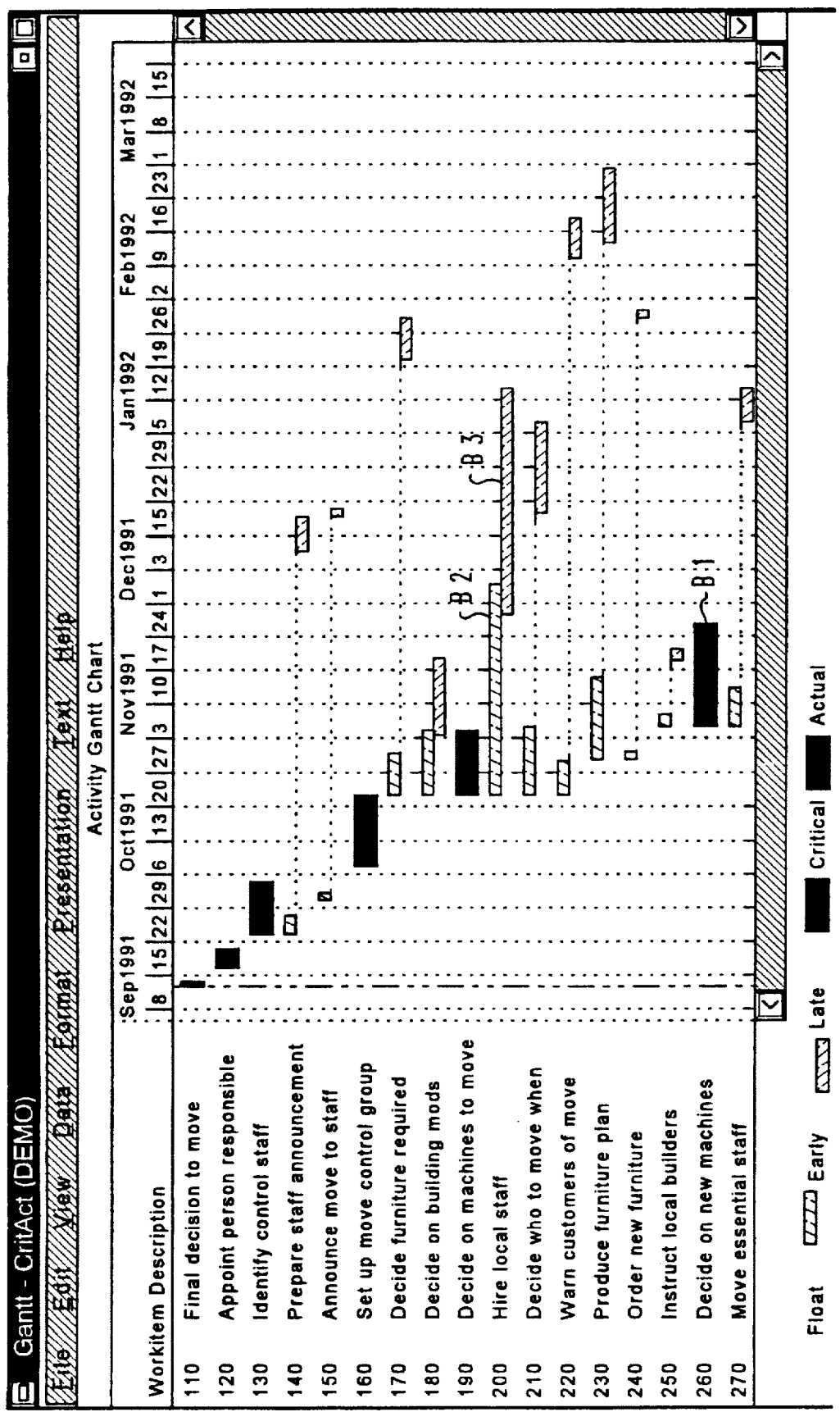
FIG. 4 is an illustration of a known Gantt chart.
Figure 5:
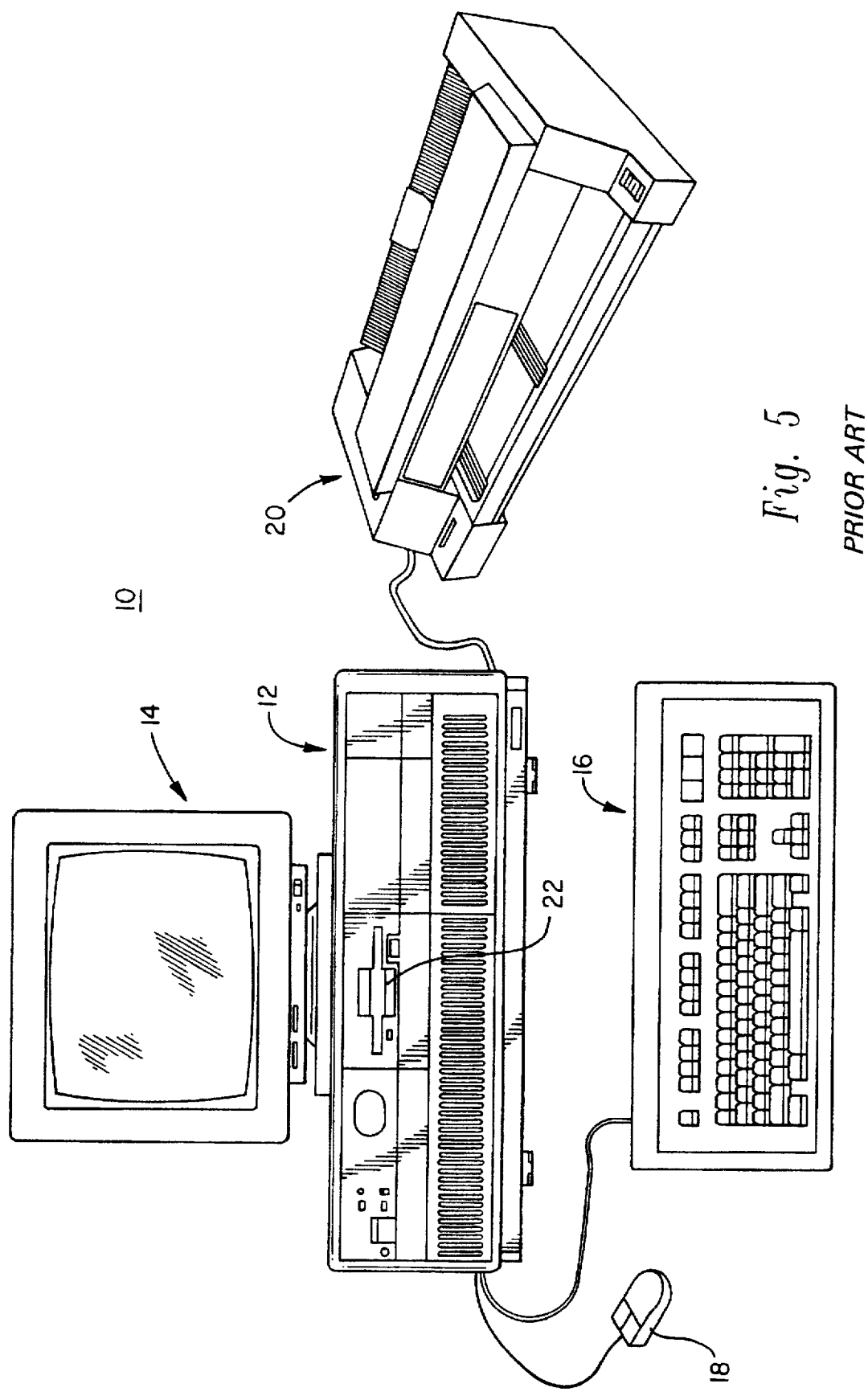
FIG. 5 depicts a data processing system in which the present invention can be employed in accordance with a preferred embodiment of the present invention.

Referring now to the figures, and in particular to FIG. 5, a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). System unit 12 can also be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions. The right mouse button is alternatively referred to as the second mouse button or mouse button 2. An optional output device, such as a printer 20, also can be connected to system unit 12. Finally, system unit 12 may include one or more mass storage devices such as the diskette drive 22.

As will be described below, the system unit 12 responds to input devices, such as PC keyboard 16, mouse 18, or local area networking interfaces. Additionally, input/output (I/O) devices, such as diskette drive 22, display 14, printer 20, and a local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user. In operation, the system processor functions under an operating system, such as IBM's OS/2 operating system or DOS. "OS/2" is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 6:
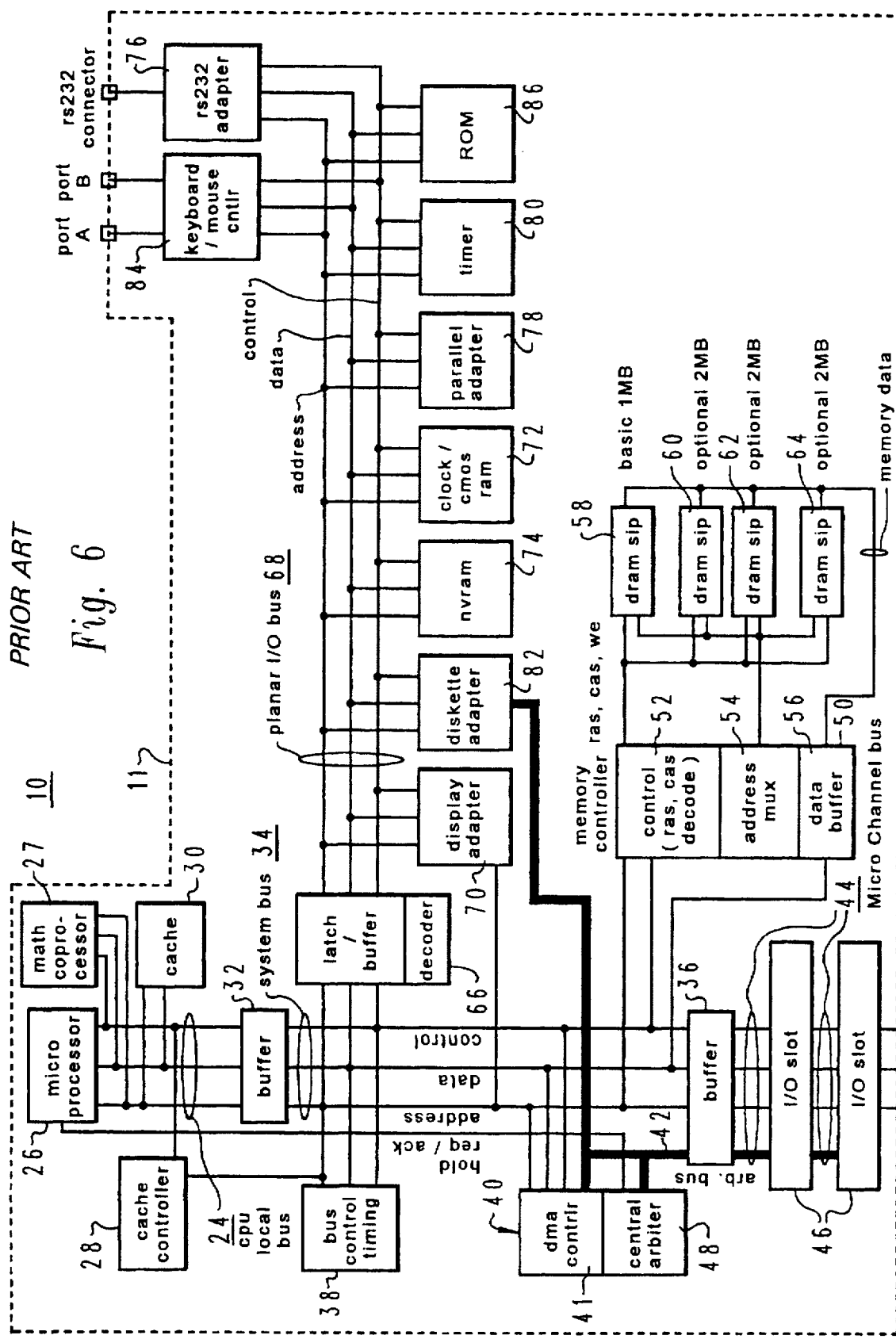
FIG. 6 is a block diagram of a personal computer system in which the present invention can be employed in accordance with a preferred embodiment of the present invention.

Prior to relating the above structure to the present invention, a summary of the operation in general of personal computer system 10 may merit review. Referring to FIG. 6, there is shown a block diagram of personal computer system 10 illustrating the various components of personal computer system 10 in accordance with the present invention. FIG. 6 further illustrates components of planar 11 and the connection of planar 11 to I/O slots 46 and other hardware of personal computer system 10. Connected to planar 11 is a system central processing unit (CPU) 26 comprised of a microprocessor which is connected by a high speed CPU local bus 24 through a bus controlled timing unit 38 to a memory control unit 50, which is further connected to a volatile random access memory (RAM) 58. While any appropriate microprocessor can be used for CPU 26, one suitable microprocessor is the 80386 which is sold by Intel Corporation.

While the present invention is described hereinafter with particular reference to the system block diagram of FIG. 6, it is to be understood at the outset of the description which follows, it is contemplated that the apparatus and methods in accordance with the present invention may be used with other hardware configurations of the planar board. For example, the system processor could be an Intel 80286, 80486, or Pentium microprocessor. "Pentium" is a trademark of Intel Corporation. These particular microprocessors can operate in a real addressing mode or a protected addressing mode. Each mode provides an addressing scheme for accessing different areas of the microprocessor's memory.

Returning now to FIG. 6, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between system bus 34 and an optional feature bus such as a Micro Channel bus 44. "Micro Channel" is a registered trademark of International Business Machines Corporation. Connected to bus 44 are a plurality of I/O slots 46 for receiving Micro Channel adapter cards, which may be further connected to an I/O device or memory. An arbitration control bus 42 couples the DMA controller 41 and central arbitration unit 48 to I/O slots 46 and diskette adapter 82. Also connected to system bus 34 is a memory control unit 50, which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While personal computer system 10 is shown with a basic 1 megabyte RAM module, it is understood that additional memory can be interconnected as represented in FIG. 6 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available, or the ASCII terminal is connected to RS232 adapter 76. Furthermore, this data is stored in NVRAM 74 whenever a special configuration program is executed. The purpose of the configuration program is to store values characterizing the configuration of this system to NVRAM 76 which are saved when power is removed from the system.

Ports A and B are connected to keyboard/mouse controller 84. These ports are used to connect a PC keyboard (as opposed to an ASCII terminal) and mouse to the PC system. Coupled to RS232 adapter unit 76 is an RS232 connector. An optional ASCII terminal also can be coupled to the system through this connector.

Specifically, personal computer system 10 may be implemented utilizing any suitable computer, such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

In accordance with a preferred embodiment of the present invention, a list of potentially affected activities is maintained. Activities are added to the list as a result of specific changes that may cause their early dates to become incorrect. When it is desired to update the early dates of the project, only the dates for the activities in this list need to recalculated. The recalculation of dates terminates when the list is empty, at which the early dates for the entire project model or project are correct.

In accordance with a preferred embodiment of the present invention, activities are added to the list according to criteria based on well known changes listed in Table 1 as follows:

TABLE 1

| Criteria for Adding Activities to the Potentially Affected List | |
|---|---|
| Change to Activity | Potentially Affected Activities to be added to the list |
| Actual Start Date | the activity changed |
| Actual Finish Date | the activity changed |
| Actual Duration | the activity changed |
| Required Date | the activity changed |
| Required Date Type | the activity changed |
| Duration | the activity changed |
| Duration Left | the activity changed |
| Percent Complete | the activity changed |
| Relationship lag | immediate successor activity |
| Relationship deleted | immediate successor activity |
| Activity deleted | all successor activities |
| TimeNow | all activities where TimeNow is now later than Early Start |
| Early Start | all successor activities |

Typically all the changes in the table, with the exception of a change in early start are initiated by the user. Changes in the early start attribute are generated by the calculations. As a result, some activities are added to the list as a result of practicing other activities in the list. Activities are removed from the list by recalculating their early dates with the formula depicted in FIG. 1.

With respect to late dates, a similar list is maintained and activities are added to the list for late dates, in accordance with a preferred embodiment of the present invention, utilizing criteria based on well known changes in the following table:

TABLE 2

| Changes and their associated potentially affected activities | |
|---|---|
| Change | Potentially Affected Activities |
| Actual Start Date | the activity changed |
| Actual Finish Date | the activity changed |
| Actual Duration | the activity changed |
| Required Date | the activity changed |
| Required Date Type | the activity changed |
| Duration | the activity changed |
| Duration Left | the activity changed |
| Percent Complete | the activity changed |
| Relationship lag | immediate predecessor activity |
| Relationship deleted | immediate predecessor activity |
| Activity deleted | all predecessor activities |
| Early Start | activity itself only if it has no successors |
| Late Finish | all predecessor activities |

Figure 7:
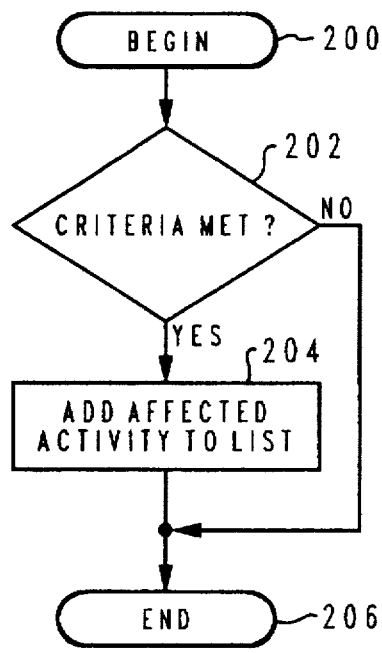
FIG. 7 depicts a flowchart of a process for list maintenance in accordance with a preferred embodiment of the present invention.
Figure 8:
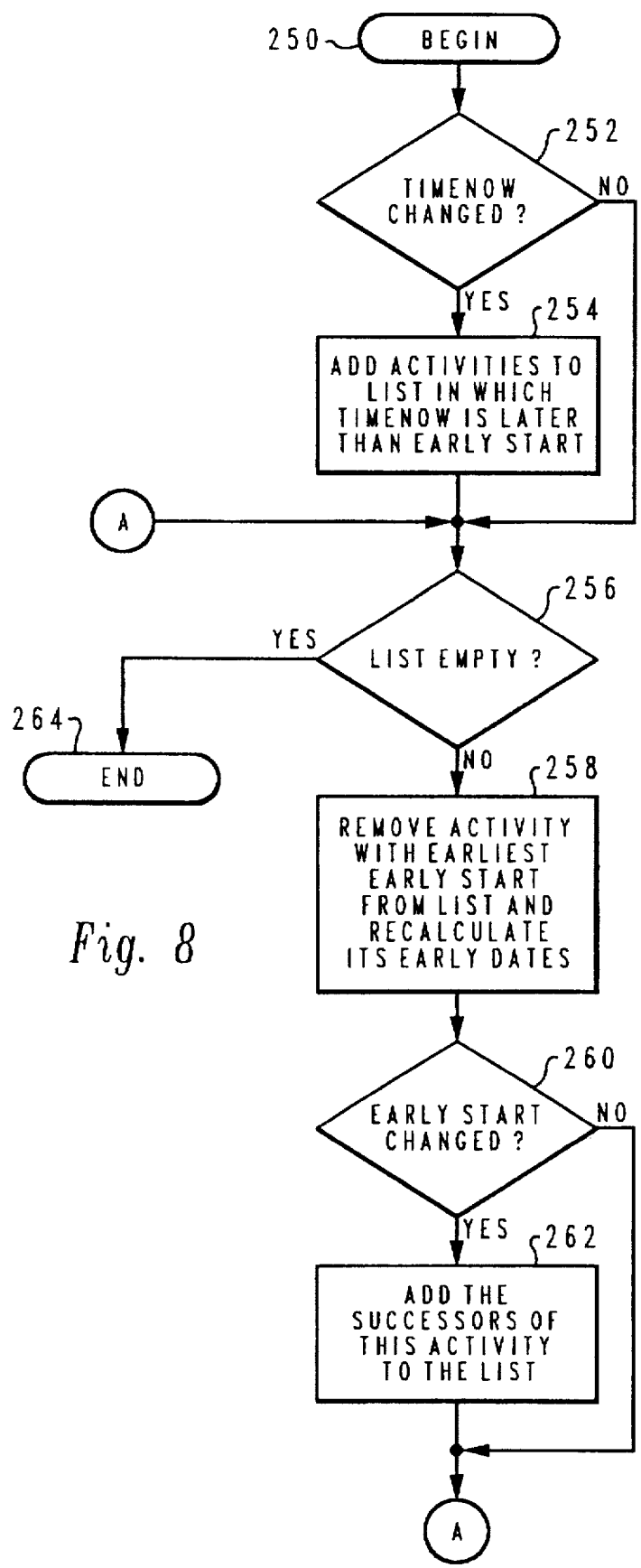
FIG. 8 is a flowchart of a recalculation process for early dates in accordance with a preferred embodiment of the present invention.
Figure 9:
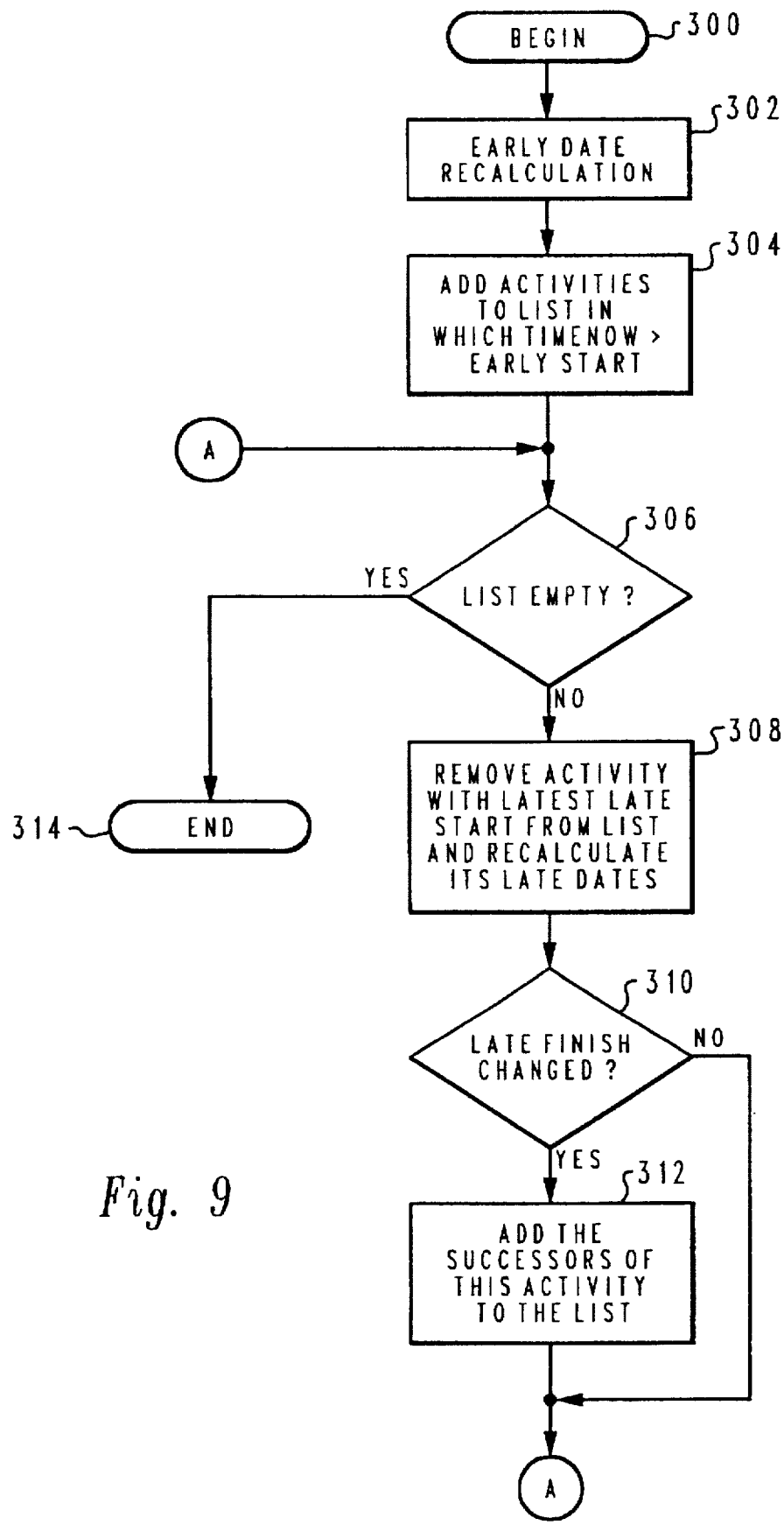
FIG. 9 depicts a flowchart of a recalculation process for late dates in accordance with a preferred embodiment of the present invention.

The following processes depicted in FIGS. 7–9 may be implemented by those of ordinary skill in the art within the data processing system depicted in FIGS. 5 and 6.

Referring now to FIG. 7, a flowchart depicting a process for list maintenance is depicted in accordance with a preferred embodiment of the present invention. This process is executed each time a user changes project data. The process begins, as illustrated in block 200 and thereafter a determination of whether criteria has been met is made, as depicted in block 202. The criteria are those found in Table 1 and Table 2 in accordance with a preferred embodiment of the present invention. A list of activity for early dates would employ the criteria in table 1 while a list of activities for late dates would utilize the criteria in Table 2. If the criteria is met, the process then adds the affected activity to the list, as illustrated in block 204 with the process thereafter terminating, as depicted in block 200. Referring again to block 202, if the criteria is not met the process then terminates without adding the activity to the list. This process may be implemented for both early and late dates.

Referring now to FIG. 8, a flowchart of a recalculation process for early dates is illustrated in accordance with a preferred embodiment of the present invention. The process begins, as illustrated in block 250 and thereafter, a determination of whether Time Now (TimeNow) has changed is made, as depicted in block 252. If time now has changed, activities are added to the list in which TimeNow is later than Early Start, as illustrated in block 254. The process then determines whether the list is empty, as depicted in block 256. If the list is not empty, the process then removes the activity with the earliest Early Start from the list and recalculates its early dates, as illustrated in block 258. Early dates are recalculated employing the formulas found in FIG. 1 in accordance with a preferred embodiment of the present invention.

Next, a determination of whether early start is made, as depicted in block 260. If the early start has changed, the successors to this activity are added to the list, as illustrated in block 262. Thereafter the process returns to block 256. If, however, the Early Start has not changed, the process returns directly to block 256, skipping block 262. Referring again to block 256, if the list is empty the process terminates, as depicted in block 264.

Referring again to block 252 if time now has not changed, the process proceeds directly to block 256, skipping block 254. This process is executed upon a request by the user in accordance with a preferred embodiment of the present invention.

Referring now to FIG. 9, a flowchart of a recalculation process for late dates is depicted in accordance with a preferred embodiment of the present invention. The process begins as illustrated in block 300 and early date recalculation is performed, as depicted in block 302. Thereafter, activities are added to the list in which time now is greater than Early Start, as illustrated in block 304 in other words, the activities added to the list are those in which time now is later than Early Start. Thereafter, the process determines whether the list is empty, as depicted in block 306. If the list is not empty, the activity with the latest Late Start is removed from the list and its late dates are recalculated, as illustrated in block 308.

Next, a determination of whether the Late Finish has changed is made, as depicted in block 310. If the Late Finish has changed, the successors of this activity are added to the list, as illustrated in block 312. Thereafter, the process returns to block 306. Referring again to block 310, if the Late Finish has not changed, the process proceeds directly to block 306, skipping block 312. If the list is empty in block 306, the process terminates, as depicted in block 314.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for modifying a project model in response to an update, said project model including a plurality of activities, wherein each of said plurality of activities includes an early start date wherein said activity cannot be commenced prior to said early start date, said method comprising:

(a) initially adding a number of activities from said project model to a list in response to an update, wherein each activity added is directly affected by said update;

(b) removing an activity from said list, wherein said removed activity has an early start date that precedes all other early start dates with respect to other activities within said list;

(c) redetermining said early start date for said removed activity in response to said update;

(d) adding activities which succeed said removed activity and-which are related to said activity to said list in response to an absence of a match between said redetermined early start date and said early start date associated with said removed activity; and (e) repeating steps (b) through (d) until said list is empty, wherein said project model is efficiently modified.

2. The method of claim 1 further comprising determining a early finish date for said removed activity in response to redetermining said early start date.

3. The method of claim 1, wherein said initially adding step comprises adding activities from said project model to said list in response to comparing an update to a plurality of preselected criteria.

4. A method in a data processing system for modifying a project model in response to an update, said project model including a plurality of activities, wherein each of said plurality of activities includes a late finish date and a late start date, wherein said activity cannot be completed after said late finish date, said method comprising:

(a) initially adding a number of activities from said project model to a list in response to an update, wherein each activity added is directly affected by said update;

(b) removing an activity from said list, wherein said removed activity has a late start date that is later than all other late start dates with respect to other activities within said list;

(c) redetermining said late finish date and said late start date for said removed activity in response to said update;

(d) adding activities which succeed said removed activity and which are related to said activity to said list in response to an absence of a match between said redetermined late finish date and said late finish date associated with said removed activity; and (e) repeating steps (b) through (d) until said list is empty, wherein said project model is efficiently modified.

5. The method of claim 4, wherein said initially adding step comprises adding activities from said project model to said list in response to comparing said an update to a plurality of preselected criteria.

6. A data processing system for modifying a project model in response to an update, said project model including a plurality of activities, wherein each of said plurality of activities includes an early start date wherein said activity cannot be commenced prior to said early start date, said data processing system comprising:

first addition means for initially adding a number of activities from said project model to a list in response to an update, wherein each activity added is directly affected by said update;

removal means for removing an activity from said list, wherein said removed activity has an early start date that precedes all other early start dates with respect to other activities within said list;

determination means for redetermining said early start date for said removed activity in response to said update;

second addition means for adding activities which succeed said removed activity and which are related to said activity to said list in response to an absence of a match between said redetermined early start date and said early start date associated with said removed activity; and means for continuing to initiate said removal, determination, and second addition means until said list is empty, wherein said project model is efficiently modified.

7. The data processing system of claim 6, further comprising means for determining an early finish date for said removed activity responsive to said determination means redetermining said early start date.

8. The data processing system of claim 6, wherein said first addition means comprises means for adding activities from said project model to said list in response to a comparison an update to a plurality of preselected criteria.

9. The data processing system of claim 8, wherein said plurality of preselected criteria includes an alteration of an actual start date.

10. The data processing system of claim 8, wherein said plurality of preselected criteria includes an alteration in an actual finish date.

11. The data processing system of claim 8, wherein said plurality of preselected criteria includes an alteration in an early start date.

12. The data processing system of claim 8, wherein said plurality of preselected criteria includes an alteration in a late finish date.

13. The data processing system of claim 8, wherein said plurality of preselected criteria includes an alteration in a duration of an activity.

14. A data processing system for modifying a project model in response to an update, said project model including a plurality of activities, wherein each of said plurality of activities includes a late finish date and a late start date, wherein said activity cannot be completed after said late finish date, said data processing means comprising:

first addition means for initially adding a number of activities from said project model to a list in response to an update, wherein each activity added is directly affected by said update;

removal means for removing an activity from said list, wherein said removed activity has a late start date that is later than all other late start dates with respect to other activities within said list;

determination means for redetermining said late finish date and said late start date for said removed activity in response to said update;

second addition means for adding activities which succeed said removed activity and which are related to said activity to said list in response to an absence if a match between said redetermined late finish date and said late finish date associated with said removed activity; and means for continuing to initiate said removal, determination, and second addition means until said list is empty, wherein said project model is efficiently modified.

15. The data processing system of claim 14, further comprising means for determining a late start date for said removed activity responsive to said determination means redetermining said early start date.

16. The data processing system of claim 14, wherein said first addition means comprises means for adding activities from said project model to said list in response to a comparison an update to a plurality of preselected criteria.

17. The data processing system of claim 16, wherein said plurality of preselected criteria includes an alteration of an actual start date.

18. The data processing system of claim 16, wherein said plurality of preselected criteria includes an alteration in an actual finish date.

19. The data processing system of claim 16, wherein said plurality of preselected criteria includes an alteration in an early start date.

20. The data processing system of claim 16, wherein said plurality of preselected criteria includes an alteration in a late finish date.

21. The data processing system of claim 16, wherein said plurality of preselected criteria includes an alteration in a duration of an activity.

* * * * *